United States Patent Office 3,256,238
Patented June 14, 1966

3,256,238
POLYMERS STABILIZED WITH DIBENZOATE
ESTERS OF DIPHENOLIC COMPOUNDS
Constantine E. Anagnostopoulos, St. Louis, Mo., and Aubert Y. Coran, Charleston, W. Va., assignors to Monsanto Company, a corporation of Delaware
No Drawing. Filed Feb. 7, 1963, Ser. No. 256,825
20 Claims. (Cl. 260—45.85)

The present invention relates to improved organic materials and more particularly deals with highly polymeric substances such as those which are employed in the manufacture of molding and extruding compositions, films, sheets, textiles, papers, surface or coating compositions, impregnating agents, solid foams, rubbers, etc. More particularly, this invention relates to compositions comprising such highly polymeric substances in combination with an adjuvant which has the property of stabilizing the properties of the polymer against the degradative effects of ultraviolet light.

In accordance with this invention, it has been found that the properties of a polymer, selected from the class consisting of natural and synthetic, linear and cross-linked polymers, are improved by incorporating therein a stabilizing amount of a compound of the formula,

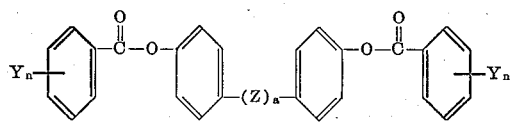

wherein:

$a$ is an integer from 0 to 1;
$n$ is an integer from 0 to 1;
Z is selected from the group consisting of alkylidene of 3 to 6 carbon atoms and cycloalkylidene of 5 to 6 carbon atoms; and
Y is selected from the group consisting of alkyl of 1 to 12 carbon atoms, alkoxy of 1 to 12 carbon atoms, and chlorine.

The alkyl substituents represented by Y can be either straight or branched alkyl chains; e.g., methyl, ethyl, n-propyl, isopropyl, n-butyl, isobutyl, sec.-butyl, t-butyl, n-amyl, isoamyl, n-hexyl, 1,1-dimethylbutyl, isoheptyl, n-octyl, 2-ethylhexyl, 1,1,3,3-tetramethylbutyl, n-nonyl, isodecyl, undecyl and dodecyl.

The alkoxy substituents represented by Y can also be either straight or branched chains; e.g., methoxy, ethoxy, propoxy, isopropoxy, n-butoxy, t-butoxy, isopentyloxy, hexyloxy, 1-methylpentyloxy, isoheptyloxy, octyloxy, 2-ethylhexyloxy, nonyloxy, decyloxy and dodecyloxy.

The alkylidene radicals represented by Z are exemplified by propylidene, isopropylidene, butylidene, sec.-butylidene, pentylidene, isopentylidene, hexylidene and 2-methylpentylidene. The cycloalkylidene radicals are cyclopentylidene and cyclohexylidene.

Illustrative examples of specific dibenzoate esters contemplated by the foregoing formula are:

4,4'-dihydroxybiphenyl, dibenzoate ester
4,4'-dihydroxybiphenyl, bis(2-methylbenzoate) ester
4,4'-dihydroxybiphenyl, bis(4-isopropylbenzoate) ester
4,4'-dihydroxybiphenyl, bis(3-tert.-butylbenzoate) ester
4,4'-dihydroxybiphenyl, bis(4-nonylbenzoate) ester
4,4'-dihydroxybiphenyl, bis(4-dodecylbenzoate) ester
4,4'-dihydroxybiphenyl, bis(2-ethoxybenzoate) ester
4,4'-dihydroxybiphenyl, bis(3-isohexyloxybenzoate) ester
4,4'-dihydroxybiphenyl, bis(4-decyloxybenzoate) ester
4,4'-dihydroxybiphenyl, bis(3-chlorobenzoate) ester
Propylidene-4,4'-bisphenol, dibenzoate ester
Propylidene-4,4'-bisphenol, bis(2-ethylbenzoate) ester
Isobutylidene-4,4'-bisphenol, bis(2-chlorobenzoate) ester
Butylidene-4,4'-bisphenol, dibenzoate ester
Butylidene-4,4'-bisphenol, bis(4-hexyloxybenzoate) ester
Pentylidene-4,4'-bisphenol, bis(3-isopropoxybenzoate) ester
Isopentylidene-4,4'-bisphenol, bis(4-decylbenzoate) ester
2-ethylbutylidene-4,4'-bisphenol, bis(4-chlorobenzoate) ester
Cyclopentylidene-4,4'-bisphenol, bis(4-methylbenzoate) ester
Cyclopentylidene-4,4'-bisphenol, bis(2-isopropoxybenzoate) ester
Cyclohexylidene-4,4'-bisphenol, benzoate ester
Cyclohexylidene-4,4'-bisphenol, bis(4-chlorobenzoate) ester.

The dibenzoate esters of this invention can be prepared by reacting a benzoyl halide with an appropriate bisphenol. It will be apparent to those skilled in the art that various other known methods of ester preparation can be readily substituted.

From the standpoint of optimum stabilizing effectiveness, and also considering the starting materials used and the commercial practicality, an especially preferred group of dibenzoate esters is characterized by the formula,

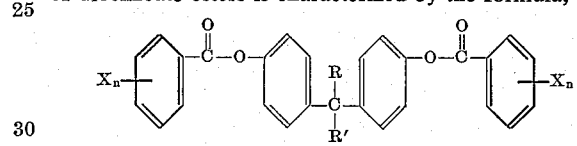

wherein:

X represents alkyl of 1 to 12 carbon atoms;
$n$ is an integer from 0 to 1;
R and R' each represent alkyl of 1 to 3 carbon atoms; and
The total number of carbon atoms in R+R' is from 2 to 4.

Typical examples of this preferred group of esters are:

Isopropylidene-4,4'-bisphenol, dibenzoate ester
Isopropylidene-4,4'-bisphenol, bis(2-ethylbenzoate) ester
Isopropylidene-4,4'-bisphenol, bis(4-isopropylbenzoate) ester
Sec.-butylidene-4,4'-bisphenol, bis(4-isohexylbenzoate) ester
Sec.-butylidene-4,4'-bisphenol, bis(4-nonylbenzoate) ester
Diethylmethylene-4,4'-bisphenol, bis(2-methylbenzoate) ester
Diethylmethylene-4,4'-bisphenol, bis(4-ethylbenzoate) ester.

As hereinbefore disclosed, the polymeric materials which are modified by the dibenzoate esters of this invention are natural and synthetic, linear and cross-linked polymers, which are subject to ultraviolet light deterioration.

In general, such polymers include the fibrous cellulosic products of natural materials, the starches, the natural gums and rubbers; those obtained from monomers having ethylenic unsaturation such as vinyl and vinylidene compounds, $\alpha,\beta$-olefinic dicarboxylic acids and their derivatives, unsaturated cyclic esters of carbonic acid, and dienes and polyenes; polymers from polymerizable heterocyclics; those containing elements such as phosphorus, boron, sulfur and silicon; the synthetic cellulose derivatives; the linear and cross-linked polyesters; the epoxy resins; the polyurethanes; the phenolic resins; the aminoplasts; the polyamides such as nylons, polypeptides and polymeric lactams; and the polymeric aldehydes. A detailed description of these polymeric materials, and others which are stabilized by the dibenzoate esters of this invention, is found in copending application Serial No. 202,679, filed June 15, 1962.

In evaluating the light-stabilizing efficiency of the dibenzoate esters of this invention, use is made of the following empirical testing methods:

(1) *Carbonyl content.*—The carbonyl content of the composition is determined after exposure by measurement of the infrared absorption in the 5.82 millimicron region and is expressed as mols×10⁴ per liter. Reference is made to the following two publications concerning the determination of carbonyl content by infrared measurements: Rugg, Smith and Bacon, J. Polymer Sci. 13, 535 (1954); Cross, Richards and Willis, Discussions Faraday Soc., No. 9, 235 (1950).

(2) *Vinyl group formation.*—Infrared spectrographic measurements are made before and after exposure using the baseline technique in the region of 11.0 microns and the extinction coefficients of J. A. Anderson and W. D. Sugfried, Anal. Chem. 20, 998 (1948). The amount of vinyl (C=C) formed during exposure is expressed in mols×10⁴ per liter.

(3) *180° bend test.*—Specimens were folded, and the amount of cracking, crazing, etc., was recorded.

The following procedures, in which all parts and percentages are by weight unless otherwise specified, more fully illustrate the nature of the invention.

Procedure 1

Test compositions are prepared by incorporating the additive into linear polyethylene (mol. wt. 10,000) on a heated roll mill. Thereafter the polyethylene is compression molded into sheets about 6 mils thick. Film samples containing the various additives noted below, and control films containing no additives, are exposed to ultraviolet radiation, a major portion of which is due to the 3130 and 3657 A. mercury lines (General Electric H3FE lamp). The films are exposed at a distance of 5 inches from the light source having a total ultraviolet emission of about 10 watts for various periods of hours. The results obtained for several dibenzoate esters of this invention are set forth in Table A, below. The additives employed are:

(A) Isopropylidene-4,4'-bisphenol, dibenzoate ester
(B) 4,4'-dihydroxybiphenyl, dibenzoate ester
(C) Butylidene-4,4'-bisphenol, dibenzoate ester
(D) Cyclohexylidene-4,4'-bisphenol, dibenzoate ester
(E) 4,4'-dihydroxybiphenyl, bis(4-isopropylbenzoate) ester
(F) Isopropylidene-4,4'-bisphenol, bis(4-isopropylbenzoate) ester
(G) Isopropylidene-4,4'-bisphenol, bis(2-ethoxybenzoate) ester.

Results similar to those obtained with Composition 1–8 are realized upon substituting the following compounds, in substantially the same amount, for the dibenzoate ester of said composition:

4,4'-dihydroxybiphenyl, bis(2-methylbenzoate) ester
Propylidene-4,4'-bisphenol, bis(2-chlorobenzoate) ester
Butylidene-4,4'-bisphenol, bis(4-decyloxybenzoate) ester
Isopentylidene-4,4'-bisphenol, bis(4-dodecylbenzoate) ester
Cyclopentylidene-4,4'-bisphenol, dibenzoate ester Results similar to those obtained with Compositions 1–4 and 1–21 are realized upon substituting the following compounds, in substantially the same amount, for the dibenzoate esters of said compositions:

Isopropylidene-4,4'-bisphenol, bis(2-ethylbenzoate) ester
Sec.-butylidene-4,4'-bisphenol, bis(4-nonylbenzoate) ester
Diethylmethylene-4,4'-bisphenol, dibenzoate ester

Procedure 2

A piece of thin rubber film (natural gum rubber) is placed in chloroform for one hour, removed and then dried for two hours at room temperature. This piece is cut into two smaller pieces, one of which is placed in a chloroform solution containing 0.45% (w./v.) isopropylidene-4,4'-bisphenol, bis(4-isopropylbenzoate) ester for one hour and then dried at room temperature. The two pieces are exposed for 60 hours to an ultraviolet lamp (General Electric H3FE) at a distance of 5 inches.

The rubber film containing the dibenzoate ester can be stretched several times its length without breaking, while the film which does not contain said ester breaks when it is extended 1½ times its length.

Similar results are obtained when the dibenzoate ester used above is replaced with the same amount of other esters of Procedure 1.

Procedure 3

A piece of Watman filter paper (pure, unsized, cellulosic paper) is cut into two pieces. One piece (control sheet A) is dipped in a chloroform solution and then dried. The other piece is dipped in a chloroform solution containing 0.45% (w./v.) isopropylidene-4,4'-bisphenol, bis(4-isopropylbenzoate) ester and then dried (stabilized sheet B). Each of these sheets is exposed for a total of 60 hours to a General Electric UA–2 lamp at a distance of 10 inches. The tensile strength (lb./in.) of each of the sheets (i.e., control sheet A and stabilized sheet B) is tested at various intervals, and the paper containing the additive is of greater tensile strength.

TABLE A

| Composition No. | Additive | Hours | Conc., Percent | Carbonyl Content | Vinyl Formation | Response to Bend Test |
|---|---|---|---|---|---|---|
| 1-1 | None | 100 | | 115 | | |
| 1-2 | (A) | 100 | 1.0 | 28 | | |
| 1-3 | None | 200 | | 300 | 280 | Poor. |
| 1-4 | (A) | 200 | 1.0 | 140 | 50 | Good. |
| 1-5 | None | 65 | | 94 | 118 | |
| 1-6 | (B) | 65 | 1.0 | 96 | 30 | |
| 1-7 | None | 157 | | | 251 | Poor. |
| 1-8 | (B) | 157 | 1.0 | | 89 | Fair. |
| 1-9 | None | 100 | | | 107 | |
| 1-10 | (C) | 100 | 1.0 | | 22 | |
| 1-11 | None | 200 | | | 290 | Poor. |
| 1-12 | (C) | 200 | 1.0 | | 62 | Fair. |
| 1-13 | None | 200 | | 693 | 513 | Very Poor. |
| 1-14 | (D) | 200 | 1.0 | 443 | 80 | Fair. |
| 1-15 | None | 200 | | | 425 | Poor. |
| 1-16 | (E) | 200 | 1.0 | | 120 | Fair. |
| 1-17 | None | 92 | | 89 | 66 | |
| 1-18 | (F) | 92 | 1.0 | 18 | 38 | |
| 1-19 | (G) | 92 | 1.0 | 25 | 27 | |
| 1-20 | None | 279 | | 318 | 175 | Poor. |
| 1-21 | (F) | 279 | 1.0 | 145 | 99 | Good. |
| 1-22 | (G) | 279 | 1.0 | 295 | 40 | Fair. |

Similar results are obtained when the dibenzoate ester used on sheet B is replaced by the same amount of others of the esters of Procedure 1, in that the tensile strength of the sheet containing the ester is greater than the tensile strength of the control sheet.

Procedure 4

Ten grams of powdered polypropylene (visc. molecular weight 220,000) are mixed with 0.4% of bis-lauryl thiodipropionate, 0.3% of 4,4'-butylidenebis-(6-tert.-butyl-m-cresol) and isopropylidene-4,4'-bisphenol, dibenzoate ester. The mixture is worked on a roll mill at 165–170° C. for 2–3 minutes. Films are formed from pieces of the milled sheets (0.8" x 1.2" x 0.012") by heat and pressure (11.3 kg.) between two polished glass plates (treated with dimethyldichlorosilane vapor and washed clean with chloroform and acetone) using copper wire spacers of suitable thicknesses. The "sandwiches" are heated under pressure on a hot plate (220–230° C.) for about 5 minutes and 10 minutes for 8-mill and 4-mill films, respectively. After air-cooling to about room temperature, the films are removed from the plates. Control films containing no ester are prepared in the same manner.

The films are exposed to direct sunlight in the State of Florida by mounting the films (unbacked at an angle of 45° from the horizontal) on racks facing the south. Samples of each film are removed periodically and tested for carbonyl content. The results obtained are set forth in Table B:

TABLE B

| Composition No. | Conc. (Percent by Weight) | Film Thickness, mils | Carbonyl Content | | |
|---|---|---|---|---|---|
| | | | 1 Month | 2 Months | 3 Months |
| 5-1 | None | 4 | 111 | 940 | 5,950 |
| 5-2 | None | 8 | 181 | 830 | (¹) |
| 5-3 | 1.0 | 4 | 75 | 225 | 392 |
| 5-4 | 2.0 | 4 | | 150 | 210 |
| 5-5 | 0.5 | 8 | 123 | 250 | 454 |
| 5-6 | 1.0 | 8 | | 230 | 187 |
| 5-7 | 2.0 | 8 | | 123 | 160 |

¹ Film gone.

Similar results are obtained when equal amounts of other esters of this invention are substituted for the above-named dibenzoate.

Procedure 5

A series of film samples are prepared, each sample containing isopropylidene-4,4'-bisphenol, dibenzoate ester. The additive is incoporated into the polymers either by addition to the solution prior to casting or by working polymer and additive on a stainless steel hot plate with a spatula. The films are prepared either by casting the mixture from an appropriate solvent or by pressing the mixture of polymer and additive between two glass slides at 190–240° C. Film thickness varies, depending upon the method of preparation. However, differences in thickness between films containing the additive and the corresponding control films are kept below 10%.

The films are mounted in special holders and exposed for 150 hours to an ultraviolet light source (General Electric lamp H3FE). At the end of the exposure period, each film containing an additive is compared with the corresponding control film for gross differences in degree of deterioration. Comparisons are made by:

(1) Increase of degradation carbonyl at the infrared carbonyl region.
(2) Response to 180° bend.
(3) Response to penetration by a sharp needle.
(4) Visual observation of film condition (crazing, cracking, etc.)

The results are listed in Table C. The degree of stabilization due to the additive is rated as follows:

(1) Some evidence of stabilization.
(2) Definite evidence of stabilization.
(3) Control deteriorated (cracked, disintegrated, etc., in holder), whereas the film containing the additive does not.

TABLE C

| Composition No. | Polymer Name | Polymer Physical Properties | Film Preparation Method | Film Thickness (microns) | Conc. (Percent by Weight) | Stabilization Rating |
|---|---|---|---|---|---|---|
| 6-1 | Cellulose nitrate | Visc. (10% soln. in solv. mixture of 75% butyl acetate, 25% ethanol)=60 cps., $N_2$ content=12%. | Cast from acetone | 155 | 2.0 | 3 |
| 6-2 | Polyvinylidene chloride | Sp. gr.=1.680, $n_D^{25}$=1.615 | Pressed between 2 glass slides at 190–240° C. | 135 | 2.0 | 1 |
| 6-3 | Styrenebutadiene | Sp. gr.=1.030, Iodine No.=57.8, $n_D^{25}$=1.5785. | Pressed between 2 glass slides at 190–240° C. | 230 | 2.0 | 1 |
| 6-4 | Styreneacrylonitrile | Sp. gr.=1.075, HDT at 264 p.s.i.= 198° F. | Pressed between 2 glass slides at 190–240° C. | 173 | 2.0 | 2 |
| 6-5 | Chlorinated rubber | 67% chlorine, sp. gr.=1.563, $n_D^{25}$=1.554 | Cast from benzene | 50 | 1.3 | 3 |

Similar results are obtained when equal amounts of the following other dibenzoate esters are substituted for the ester of this procedure:

4,4'-dihydroxybiphenyl, dibenzoate ester
4,4' - dihydroxybiphenyl, bis(4 - isopropylbenzoate) ester
4,4' - dihydroxybiphenyl, bis(2 - ethoxybenzoate) ester
Propylidene-4,4'-bisphenol, dibenzoate ester
Isopropylidene-4,4' - bisphenol, bis(4 - isopropylbenzoate) ester
Sec.-butylidene-4,4' - bisphenol, bis(4 - nonylbenzoate) ester
Cyclohexylidene-4,4'-bisphenol, benzoate ester In each case, the film containing the additive exhibits evidence of stabilization when compared with the control film.

Procedure 6

This procedure demonstrates the stabilizing effect of the following compounds on polystyrene:

(A) 4,4'-dihydroxybiphenyl, dibenzoate ester
(B) 4,4' - dihydroxybiphenyl, bis(2 - methylbenzoate) ester
(C) 4,4' - dihydroxybiphenyl, bis(4 - isopropylbenzoate) ester
(D) 4,4' - dihydroxybiphenyl, bis(4 - dodecylbenzoate) ester
(E) 4,4' - dihydroxybiphenyl, bis(2 - ethoxybenzoate) ester
(F) 4,4' - dihydroxybiphenyl, bis(4 - decycloxybenzoate) ester
(G) Propylidene-4,4'-bisphenol, dibenzoate
(H) Isopropylidene-4,4'-bisphenol, dibenzoate ester
(I) Isopropylidene-4,4' - bisphenol, bis(4 - isopropylbenzoate) ester
(J) Butylidene-4,4'bisphenol, dibenzoate ester
(K) Isobutylidene - 4,4' - bisphenol, bis(2 - chlorobenzoate) ester

Procedure 6—Continued (L) Sec.-butylidene-4,4' - bisphenol, bis(4 - nonylbenzoate) ester
(M) Pentylidene-4,4' - bisphenol, bis(3 - isopropoxybenzoate) ester
(N) Diethylmethylene - 4,4' - bisphenol, bis(4 - ethylbenzoate) ester
(O) 2 - ethylbutylidene - 4,4' - bisphenol, bis(4 - chlorobenzoate) ester
(P) Cyclopentylidene - 4,4' - bisphenol, bis(4 - methylbenzoate) ester
(Q) Cyclohexylidene - 4,4' - bisphenol, benzoate ester To 10% solutions of polystyrene in benzene, there is respectively added each of the above compounds in a quantity calculated to be 2% by weight of the total solids content.

The resulting mixtures are air dried at room temperature and then pressed between two glass slides at 190° C. to a thickness of about 150 microns. Control films are prepared in a similar manner. Each film is mounted in a holder and exposed to an ultraviolet lamp (General Electric lamp H3FE) for a period of 200 hours. At the end of this period, the control film shatters when pierced by a sharp needle, whereas each film containing a dibenzoate ester additive does not shatter when pierced with the needle.

Procedure 7

Compounds (A), (H), (L) and (O) of Procedure 6 are respectively added to a high molecular weight polymeric formaldehyde resin (specific gravity=1.425; HDT at 264 p.s.i.=212° F.; modulus of rigidity= 178,000 p.s.i.) by working the compound and the resin on a stainless steel hot plate and then pressing the resulting mixture in a film (thickness ca. 150 microns) between two glass plates at a temperature of 190–240° C. Two control films are prepared in a similar manner. The films are placed in holders and exposed at a distance of 5 inches from the ultraviolet rays of a General Electric H3FE lamp for a total of 150 hours. At the end of the test period, the control films break when subjected to the 180° bend test, while the films containing the additive of this invention do not.

Procedure 8

The stabilizing effect of Compounds (C), (E), (I) and (M) of Procedure 6 on polyvinyl chloride is described in this procedure. Each of these stabilizers is blended with a polyvinyl chloride mixture (containing 40 parts per 100 parts of resin of di(2-ethylhexyl) phthalate and 0.5 part per 100 parts of resin of cadmium-barium dilaurate) in an amount which is sufficient to provide 2.7 parts by weight of stabilizer based on the polyvinyl chloride content. Each mixture is pressed, at temperatures of 190–240° C., into a film about 150 microns thick and exposed to an ultraviolet lamp as in Procedure 7. Control films are prepared and exposed in a similar manner except, of course, that no stabilizer is added. After exposure, the films are examined visually for deterioration. In each case, the films containing the dibenzoate esters exhibit less deterioration than do the control films.

Procedure 9

This procedure describes the light-stabilizing effect of Compounds (B), (H), (K) and (Q) of Procedure 6 in cellulose acetate.

Each of said compounds is respectively added to a 12% solution of cellulose acetate in acetone, said compounds being added in a quantity equal to 5% by weight of the cellulose present in the solution. Films are cast from the resulting solutions and are air dried to remove the solvent. Control films are prepared in a similar manner. The films (about 150 microns in thickness) containing the compounds, and the control films, are exposed to ultraviolet light as in Procedure 6 and examined visually at the end of the test period for evidence of deterioration. In each case, the control films show strong evidence of deterioration, while the stabilized films containing the compounds of this invention deteriorated only slightly.

Procedure 10

To a 10% solution of a 50:50 molar ratio of styrene: methyl methacrylate copolymer in benzene, there is respectively added one of Compounds (A), (I) and (O) of Procedure 6 in an amount which will provide 3% by weight of the compound based on the weight of the copolymer. The resulting mixtures, and a control mixture which does not contain a dibenzoate ester, are cast into films (about 200 microns thick) and air dried for 24 hours. After exposure to an ultraviolet light source as in Procedure 6 for a period of 300 hours, the films containing the compounds and the control film are tested for gross differences in deterioration by piercing the films with a sharp needle. In each case, the film containing the dibenzoate ester does not crack, while the control film cracks.

Procedure 11

This procedure describes the testing of Compounds (C), (H), (J) and (Q) of Procedure 6 as light stabilizers for polymeric ethyl methacrylate. Each of said compounds is added at room temperature to a separate 15% solution of the polymeric methacrylate in an amount which will provide 2% by weight of stabilizer based on the weight of polymer present. Films are cast from the resulting mixtures and air dried for 24 hours. Control films consisting of polymer are prepared in a similar manner. Each film is about 50 microns (ca. 2 mils) thick. The films are exposed as in Procedure 6 and then evaluated for gross differences in deterioration between the control films and the stabilized films. Visual observation reveals that the control films show slight evidence of degradation, while the stabilized films do not.

Procedure 12

This procedure describes the testing of Compounds (A), (C) (I) and (L) of Procedure 6 as light stabilizers for 1:1 molar copolymers of maleic anhydride and vinyl methyl ether or ethylene. Each compound is added to separate 15% solutions of the ethylene-maleic anhydride copolymer in acetone and to separate 7% solutions of the vinyl methyl ether-maleic anhydride copolymer in dimethylformamide. The quantity of the compound employed in each instance is equal to 8% by weight of the copolymer present in the solution. The resulting mixture, and control mixtures consisting of the respective copolymers and their solvents, are cast into films, and the solvent is evaporated from the films at heat lamp temperature. The films (each about 50 microns thick) are exposed to ultraviolet light as in Procedure 6 for a period of 300 hours. Evaluation of the films after the test period by visual observation indicates that the films containing the compounds are more stable to the degradative effects of ultraviolet light than are the control films.

Procedure 13

Films of approximately 0.125 inch are prepared from a polyester made from phthalic anhydride, maleic anhydride and propylene glycol (in a ratio of 1:1:2.4) and isopropylidene-4,4'-bisphenol, dibenzoate ester. Control films containing no ester are also prepared. These films are exposed to outdoor weathering in the Hazelwood, Missouri area by mounting in the manner described in Procedure 4 for various periods of time. The relative reflectance of the films is measured after exposure, and the results are set forth in Table D.

TABLE D

| Additive (percent based on weight of polyester) | Reflectance | | | |
|---|---|---|---|---|
| | Initial | 6 Months | 12 Months | 18 Months |
| None | 89 | 60 | 50 | 48 |
| Do | 90 | 60 | 52 | 49 |
| 0.5 | 90 | 74 | 70 | 65 |
| 1.0 | 90 | 76 | 73 | 70 |

Similar films are made containing Compounds (C), (E), (H), (J) and (Q) of Procedure 6. Each of these films displays similar results after exposure.

*Procedure 14*

A series of samples is prepared from a basic formulation consisting of 95 parts of a copolymer prepared from 85% vinylidene chloride and 15% vinyl chloride, and 5 parts of acetyl triethyl citrate as a plasticizer. To all but two of the samples prepared, there is respectively added an amount of the compounds employed in Procedure 13 which is equal to 3% by weight of the copolymer. The remaining two samples are left blank for comparison purposes. Each sample is pressed into a sheet 4 mils (ca. 100 microns) thick and exposed for 300 hours to an ultraviolet light as in Procedure 6. After exposure, in each case, the film containing the compounds of this invention shows significantly less deterioration than do the control films.

*Procedure 15*

A high melting, highly crystalline polyethylene, having a density of 0.950, is compounded on hot rolls with 2% by weight of isopropylidene-4,4'-bisphenol, bis(4-isopropyl-benzoate) ester. The composition is compression molded into films 5 mils thick and cut into a sample 2½ x ½ inch in size. A control film is prepared in a similar manner. These films are exposed in an Atlas Weather-Ometer containing twelve 20-watt fluorescent sun lamps and two carbon arcs, for a period of 500 hours. Examination of the infrared carbonyl content of each of the films indicates that the amount of degradation carbonyl in the stabilized film is far less than the amount of degradation carbonyl in the unstabilized film.

Similar results are obtained when the above dibenzoate is replaced with an equivalent amount of other compounds of Procedure 6.

As is obvious from the above procedures, the dibenzoate esters contemplated herein are valuable stabilizers for polymeric materials generally. The manner in which they are incorporated into or applied to the polymer materials will depend upon the individual nature of the polymer and upon its physical form; but it is generally that which is customarily employed when the same polymers in the same physical form are contacted with prior art adjuvants. Thus, when a polymer is to be employed in coatings or impregnating agents or for the production of films, additives are usually introduced into the solutions or dispersions of the finished polymer, unless the polymer is of the thermosetting type, in which case the additives can be mixed with the prepolymer and a hardening or cross-linking agent prior to curing.

When the polymer is to be used for the preparation of fibers, the stabilizer may be introduced into the extrusion melt or into the solutions from which the fibers are formed; however, for many purposes, a treating agent is often applied to fibrous materials by immersing either the fibers or textiles made therefrom into baths containing the agent. When the polymer is to be molded, the stabilizer is usually incorporated by milling a high shear milling with the hard, finished polymer prior to molding by pressure. However, here again, the point at which the stabilizer is introduced will vary with the nature of the polymer; for example, in the case of polymers which are cross-linked or in the case of thermosetting polymers, the stabilizer is more advantageously introduced together with the cross-linking agent or with the hardening agent prior to the final molding step. When the polymer is to be employed in the production of hardened foams, the stabilizer is generally added to the mix which is to be formed; however, in the case of the foam jet extrusion or pneumatogen injection extrusion, the stabilizer can be added just before the extrusion step. The point at which the present stabilizers are added or applied to the polymer is thus determinable by the current practices of the specific arts.

Variations or modifications of the compounds, and the quantities thereof employed in the above procedures, can be made to accommodate different requirements so long as the compound belongs to the general class of dibenzoate esters hereinbefore defined. The same process, as illustrated in the above procedures, will be found to be satisfactory for producing additional illustrations, e.g., by employing, in the place of the specific dibenzoate esters used in the procedures, other specific esters within the broad scope of the structural formula given at the outset of this disclosure; or by employing vinyl polymers or cellulose derivatives different from those used in the procedures, or different polymers altogether, e.g., alkyl, epoxypolyester or polyurethane resins.

The choice and the amount of the particular dibenzoate esters used to stabilize polymers can vary considerably depending upon many factors. Such factors include the nature of the particular polymer, the thickness of the film or other article, and the conditions of service to be encountered. Thus, in the stabilization of natural and synthetic rubber to be used in the manufacture of tires which are normally subjected to the action of sunlight as well as exposure to the elements, the use of relatively high concentrations of the stabilizers of this invention is advantageous. The same is true of films, such as polyethylene films, which are used in outdoor applications. On the other hand, when the article of manufacture is not to be subjected to particularly severe conditions, such as in the case of molded goods which are to be used indoors, relatively low concentrations can be successfully employed. Accordingly, the amount used is a stabilizing amount determinable by a consideration of these many factors. In general, concentrations of dibenzoate esters of from about 0.001% to about 10% by weight of the polymer can be used. Preferably, from about 0.1% to 3% by weight of said esters, based on the weight of the polymer, is used in the compositions of this invention.

Most polymeric compositions comprise many ingredients, such as plasticizers, fillers, pigments and heat stabilizers, and the compounds of this invention can be employed in conjunction with such other ingredients without any adverse effects. Likewise, the dibenzoate esters of this invention may be used in conjunction with other known light stabilizers. The ingredients can be intermixed by milling, blending, extruding or any of the other conventional methods which are well known to those skilled in the art.

The modified polymeric materials of this invention may be molded, extruded, calendered, spread or sprayed. Typical applications for such materials include molded, cast or extruded objects, continuous sheetings, tubing, fibers, films, wire coatings, textile coatings, laminates, paints, varnishes and enamels, wood preservatives, adhesives, and caulking compounds.

Increased amounts of the dibenzoate esters (i.e., over and above the amount which is per se compatible with the polymer) can be incorporated into the solid polymeric alkenes, such as polyethylene, polypropylene and polyisobutylene, by using up to 10% by weight of the polymer of finely divided silica. In general, the amount of silica used is from one to two times the amount of the dibenzoate ester which is to be incorporated in the The embodiments of the invention in which an exclusive property or privilege is claimed are defined as follows:

1. A composition comprising a polymer selected from the class consisting of natural and synthetic, linear and cross-linked polymers, and a stabilizing amount of a compound of the formula,

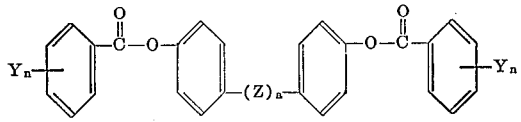

wherein:
*a* is an integer from 0 to 1;
*n* is an integer from 0 to 1;
Z is selected from the group consisting of alkylidene of 3 to 6 carbon atoms and cycloalkylidene of 5 to 6 carbon atoms; and
Y is selected from the group consisting of alkyl of 1 to 12 carbon atoms, alkoxy of 1 to 12 carbons atoms, and chlorine.

2. A composition of claim 1 further characterized in that the polymer is cellulosic.
3. A composition of claim 1 further characterized in that the polymer is a vinyl polymer.
4. A composition of claim 3 further characterized in that the polymer is a vinyl halide polymer.
5. A composition of claim 4 further characterized in that the polymer is polyvinyl chloride.
6. A composition of claim 1 further characterized in that the polymer is a polyalkylene.
7. A composition of claim 6 further characterized in that the polymer is polypropylene.
8. A composition of claim 6 further characterized in that the polymer is polyethylene.
9. A composition of claim 1 further characterized in that the polymer is a vinyl aromatic hydrocarbon polymer.
10. A composition of claim 9 further characterized in that the polymer is polystyrene.
11. A composition of claim 1 further characterized in that the polymer is a cellulose ester.
12. A composition of claim 1 further characterized in that the polymer is a polyvinyl acetal.
13. A composition of claim 1 further characterized in that the polymer is a polyester.
14. A composition comprising a synthetic linear polymer and a stabilizing amount of a compound of the formula,

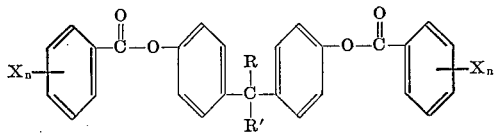

wherein:
X represents isopropyl;
*n* is an integer from 0 to 1;
R and R′ each represent alkyl of 1 to 3 carbon atoms; and
the total number of carbon atoms in R+R′ is from 2 to 4.

15. A composition of claim 14 further characterized in that the polymer is a polyalkylene.
16. A composition of claim 15 further characterized in that the polymer is polypropylene.
17. A composition of claim 15 further characterized in that the polymer is polyethylene.
18. A composition of claim 14 further characterized in that the compound is isopropylidene-4,4′-bisphenol, bis(4-isopropylbenzoate) ester.
19. A composition comprising a synthetic linear polymer and a stabilizing amount of 4,4′-dihydroxydiphenyl, dibenzoate ester.
20. A composition comprising a synthetic linear polymer and a stabilizing amount of a compound of the formula,

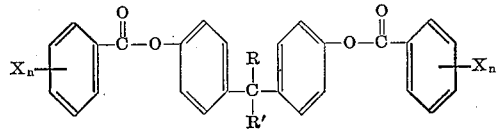

wherein:
X represents alkyl of from 1 to 12 carbon atoms;
*n* is an integer from 0 to 1; and
R and R′ each represent methyl.

References Cited by the Examiner
UNITED STATES PATENTS
3,196,185  7/1960  Ransom _____ 260—476

LEON J. BERCOVITZ, *Primary Examiner.*
G. W. RAUCHFUSS, *Assistant Examiner.*